US008495384B1

(12) United States Patent
DeLuccia (10) Patent No.: US 8,495,384 B1
(45) Date of Patent: Jul. 23, 2013

(54) DATA COMPARISON SYSTEM (76) Inventor: James DeLuccia, Atlanta, GA (US)

( * ) Notice: Subject to any disclaimer, the term of this patent is extended or adjusted under 35 U.S.C. 154(b) by 536 days.

(21) Appl. No.: 12/720,292

(22) Filed: Mar. 9, 2010

Related U.S. Application Data (60) Provisional application No. 61/158,926, filed on Mar. 10, 2009.

(51) Int. Cl.
G06F 21/24 (2006.01)
G06F 21/72 (2013.01)
G06F 21/10 (2013.01)
H04L 29/06 (2006.01)

(52) U.S. Cl.
CPC .............. G06F 21/72 (2013.01); G06F 21/10 (2013.01); H04L 63/08 (2013.01)
USPC ............ 713/189; 726/1; 726/2; 726/3; 726/4; 726/5; 726/25; 726/26; 726/27; 726/28; 726/29; 726/30

(58) Field of Classification Search
USPC .......................... 713/1–5, 26–305; 726/25–30
See application file for complete search history.

(56) References Cited

U.S. PATENT DOCUMENTS

| 5,991,881 | A   | * | 11/1999 | Conklin et al. ................ 726/22 |
| 7,571,485 | B1  | * | 8/2009  | McCorkendale et al. ...... 726/26 |
| 7,739,743 | B2  | * | 6/2010  | Itoi et al. ........................ 726/26 |
| 7,823,207 | B2  | * | 10/2010 | Evenhaim ....................... 726/26 |
| 7,865,958 | B2  | * | 1/2011  | Lieblich et al. ................ 726/25 |
| 8,201,257 | B1  | * | 6/2012  | Andres et al. .................. 726/25 |
| 8,214,907 | B1  | * | 7/2012  | Sobel et al. ..................... 726/25 |
| 2005/0177559 | A1 | * | 8/2005  | Nemoto ............................ 707/3 |
| 2008/0046757 | A1 | * | 2/2008  | Staddon et al. ............... 713/189 |
| 2008/0155697 | A1 | * | 6/2008  | Zuk ................................ 726/25 |
| 2008/0222429 | A1 | * | 9/2008  | Lacan et al. .................. 713/193 |
| 2008/0229420 | A1 | * | 9/2008  | Jeschke et al. ................ 726/25 |
| 2009/0064343 | A1 | * | 3/2009  | Chen et al. ...................... 726/27 |
| 2009/0100527 | A1 | * | 4/2009  | Booth et al. .................... 726/27 |
| 2009/0222380 | A1 | * | 9/2009  | Choudhuri et al. ............. 705/38 |
| 2009/0327748 | A1 | * | 12/2009 | Agrawal et al. ............... 713/189 |

OTHER PUBLICATIONS

R. Hasan and W. Yurcik: A statistical Analysis of Disclosed Storage Security, ACM, 2006.*

* cited by examiner

Primary Examiner — Catherine Thiaw
(74) Attorney, Agent, or Firm — Robert J. Veal (57) ABSTRACT Methods and systems to provide a score regarding the uniqueness and individuality of personal information that may be used in the process of electronic transactions for the determination of a person(s) identity. Such may be employed to limit identity theft, prevent potential insurance fraud, and be incorporated into other processes and methods to enhance the quality of identity credentials and information electronically. The comparisons that determine the above are determined from data information that is accurate and represented by the owner as accurate and true. The database containing these records is queried by the system to identify correlations. Instances where information matches across multiple records and/or highly unique fields result in a higher rated score then those that do not. A matched record does not indicate or represent fraud in itself, only that the match indicates the information no longer substantiates the uniqueness of the information and the resulting assurance of the possessor and owner are the same.

1 Claim, 6 Drawing Sheets

How data is systematically inputted and queried against system

Fig. 1: How data is systematically inputted and queried against system

Fig. 2: The technical architecture for the Subscriber activity

FIG. 3

| | | |
|---|---|---|
| contribution: 5 | contribution: 0 | contribution: 15 |
| type: requires_support | type: supportive | type: unique |
| | | |
| headerValue: lastName | headerValue: zipcode5 | headerValue: tribeFedOtherId |
| contribution: 5 | contribution: 0 | contribution: 10 |
| type: requires_support | type: supportive | type: requires_support |
| | | |
| headerValue: ssn | headerValue: zipcode9 | headerValue: LicenseExp |
| contribution: 15 | contribution: 0 | contribution: 0 |
| type: unique | type: supportive | type: supportive |
| | | |
| headerValue: employeeId | headerValue: passOrPin | headerValue: driversLicenseState |
| contribution: 10 | contribution: 5 | contribution: 0 |
| type: requires_support | type: requires_support | type: supportive |
| | | |
| headerValue: dateOfBirth | headerValue: uniqueEData | headerValue: ssnLastFour |
| contribution: 5 | contribution: 15 | contribution: 5 |
| type: requires_support | type: unique | type: requires_support |
| | | |
| headerValue: driversLicenseNum | headerValue: bioFingerprint | headerValue: addressCity |
| contribution: 10 | contribution: 15 | contribution: 0 |
| type: requires_support | type: unique | type: supportive |
| | | |
| headerValue: passport | headerValue: country | headerValue: initials |
| contribution: 10 | contribution: 0 | contribution: 5 |
| type: requires_support | type: supportive | type: requires_support |
| | | |
| headerValue: creditDebitCardNum | headerValue: province | headerValue: taxId |
| contribution: 10 | contribution: 0 | contribution: 10 |
| type: requires_support | type: supportive | type: requires_support |
| | | |
| headerValue: phoneNum | headerValue: email1 | headerValue: schoolIdNum |
| contribution: 5 | contribution: 5 | contribution: 5 |
| type: requires_support | type: requires_support | type: requires_support |
| | | |
| headerValue: streetAddress | headerValue: elecSig | headerValue: Employment |
| contribution: 5 | contribution: 15 | contribution: 5 |
| type: requires_support | type: unique | type: requires_support |
| | | |
| headerValue: bankAcctNum | headerValue: email3 | headerValue: ancestral name |
| contribution: 10 | contribution: 5 | contribution: 5 |
| type: requires_support | type: requires_support | type: requires_support |
| | | |
| headerValue: loginCredentials | headerValue: bloodType | headerValue: medicalInfo |
| contribution: 10 | contribution: 0 | contribution: 5 |
| type: requires_support | type: supportive | type: requires_support |
| | | |
| headerValue: occupationalId | | |
| contribution: 5 | | |
| type: requires_support | | |

Fig. 4

|  | Accurate? | Correct? | Stolen? |
|---|---|---|---|
| First & Last Name | ✓ | ✓ | ✓ |
| Address | ✓ | ✓ | ✓ |
| Date of Birth | ✓ | ✓ | ✓ |
| Bank Account # | ✓ | ✓ | ✓ |
| CC # | ✓ | ✓ | ✓ |
| Mother's Maiden Name | ✓ | ✓ | ✓ |
| Current Job | ✓ | ✓ | ✓ |

|  | Cancelable | #Times Changed in a Lifetime |
|---|---|---|
| First & Last Name | No | 1-2 |
| Address | No | 4-7 |
| Date of Birth | No | None |
| Bank Account # | ✓ | 4-7 |
| CC # | ✓ | 4-7 |
| Mother's Maiden Name | No | None |
| Current Job | No | 2-6 |

DATA COMPARISON SYSTEM

RELATED APPLICATION

This application claims priority to U.S. provisional patent application No. 61/158,926, filed Mar. 10, 2009, which is incorporated herewith by reference.

BACKGROUND OF THE INVENTION

The present invention is in the technical field of personal identity verification. More particularly, the present invention is in the technical field of online digital identity verification. In greater particularity, the present invention is in the technical field of private comparisons of identity parameters.

KNOWN ART

U.S. Pat. No. 7,458,508 having a filing date of Dec. 2, 2008, Shao Xuhui. Prior Art does not address or satisfy the private and unique problem of identity theft and confuses the trustworthiness of the data with the accuracy of the data.

U.S. Pat. No. 6,095,413 having a filing date of Aug. 1, 2000, Tetro Donald checks if the info is correct not if it is trustworthy.

Sensitive personal information is employed in the authentication and authorization of consumer credit, business credit, business systems (i.e., Salesforce.com, Google Docs, and online professional technical systems), personal systems (i.e., Webmail services such as Google's Gmail, online money management sites, employment recruiting websites, non-fee membership websites), entertainment systems (i.e., online gaming) and financial services as well as in many aspects of healthcare services, insurance services, and other transactional services.

This information is in some cases exposed to the public. Public can mean any person, system, entity, or device that stores, processes, transmits, or observes this information without the explicit consent from the owner. When such information is exposed as an electronic representation, or is likely to become an electronic representation, the data can proliferate online via the Internet. Internet proliferation makes containment impossible and given the velocity of information networks and declining prices in hardware it is unlikely that information destruction will become common, thus means must be found to allow the use of personal information for identity verification without unnecessary exposure.

Such information can be gathered by criminals, including organized groups of criminals. In one method of operation, these criminals sell the compromised exposed information to individuals or other teams that use the information to create false accounts and/or leverage existing accounts of common individuals to purchase goods. These goods are most commonly then sold online to convert the goods to cash through a fencing operation. The information gathered by these individuals is not maintained in an isolated manner, but sophisticated tools are used to merge data between one exposure and another. The merging of this information allows for more effective creation of financial accounts and impersonation of individual identities such that the identity of a person can be replicated with valid and accurate information by the use of a criminal database that is then employed by way of example: to create fake credit cards, open government healthcare accounts, and other such financial creditor services for the sole purpose of defrauding the institutions and accumulating wealth. The type of information exposed, either unknowingly or intentionally, is not reserved to issued financial institution account numbers. While useful in the short term, these financial accounts can be closed and have a relative short life span. However the validity of information exposed that relates to personal facts about a user do not change or infrequently change over the course of the persons life, and therefore create a life long threat to the user in all authentication and authorization scenario.

Systems and interfaces exist today that allow individuals to monitor their accounts, freeze credit rating agency accounts, real-time credit extensions, and even approve every single transaction requested via a payment card. The volume of data control and approvals available can create an unsustainable burden in terms of time and maintenance that is frequently removed by the consumer. These extensive alerts are expensive for both the monitoring service and the added costs of electronic messaging systems, and are rarely applied for periods greater then 18 months. Solutions also provide for complex algorithms that compare the activity within accounts across open shared environments. These detect the common behavior exhibited by attackers across a diverse set of consumer accounts and institutions. These all fail to address the underlying problem—the validity, unique nature, privacy, and degree of confidentiality for the information processed within these systems.

A deficiency exists in the current market assumptions surrounding the validity and authenticity of verification information provided online. The current fraud safeguards and validation systems revolve around the assumption that the data provided by the end-user is secret and private, therefore sufficient to satisfy the legal duty of identifying the individual and preventing losses. In a time where massive public databases exist and hacked information is being sold for pennies around the world organizations need to consider the originality and individuality of the data they are receiving.

The current providers establish monitoring, alerting, and reporting services for the consumer to setup. This does not protect the financial institution. Financial institutions currently absorb a majority of the identity theft costs annually and are required by law within the U.S. under Red Flag legislation and others to reduce fraudulent accounts. Organizations can leverage existing monitoring solutions (such as products provided by Equifax) to determine if credit watches are activated on a specific account, but this is only for a single account, and requires the following to occur:

1. The consumer is aware that their information has been breached;
2. The organization is willing to accept the costs of such monitoring;
3. The organization is proactive in setting up and managing these services; and
4. The consumer has the education, training, and ongoing updates to adequately respond to the provided alerts.

At this time there are no known means for centralizing this data and allowing anonymous comparison to occur for all parties at risk.

BRIEF SUMMARY OF THE INVENTION

I describe a method and system to provide a score or value reflecting the uniqueness and individuality of personal information to be used in electronic transactions for the verification of a person(s) identity. Such may be employed to limit identity theft, prevent potential insurance fraud, and be incorporated into other processes and methods to enhance the quality of identity credentials and information electronically. This invention introduces a new component to the validation process that establishes these facts. This invention closes the gap between the current paradigm of user access and authorization with that of digital repositories and their true lifetime value.

There are two immediate groups of beneficiaries of this invention. The first is the companies that are the victims of a security breach (Data Providers), and the second are institutions that rely on 'personal information' to establish accounts with their organization (Subscribers).

BRIEF DESCRIPTION OF THE DRAWINGS

Apparatus and methods embodying the present invention are depicted in the accompanying figures which form a portion of this disclosure and wherein:

FIG. 4 is a table showing the weighting and associative relationships between defined data elements;

DETAILED DESCRIPTION OF THE INVENTION

Our computer implemented technology determines the validity and individuality of data in a manner that protects the unique sensitivity of the data. I utilize a double blind submission and query system that maintains the competitive market between credit providers and complies with the privacy safeguard laws that exist nationally and internationally.

Figure 1:
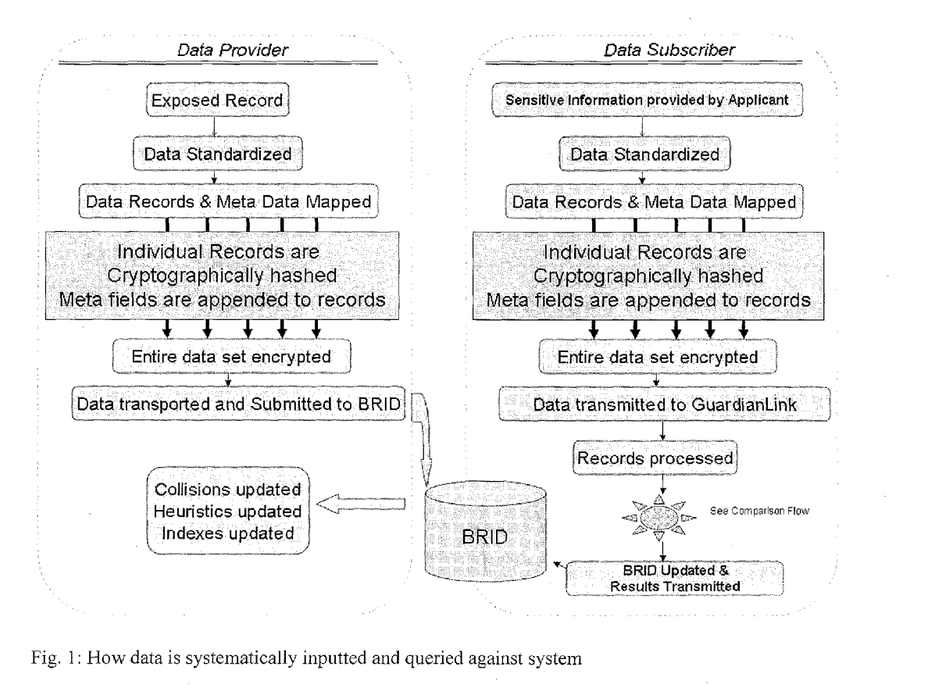
FIG. 1 is a representation of how data is input and queried in the system.

Unlike common security fraud safeguards and current solutions that allow for payment card data to be cancelled and renewed—the data exposed and addressed within this invention cannot simply be redacted. The present invention works with a database that contains representations of consumer data which is known to have been part of previously compromised data. That is to say, the database is built from submissions by entities that have identified a breach in their database security sufficient to expose some or all of their customer identification information. My method and system utilizes a Breached Record Database (BRID), as shown in FIG. 1, which contains normalized, one-way encrypted 'representations' of instances of breached data. Every item in the database has been independently cryptographically 'hashed' such that the decoding or recovery of the original information is practically impossible. The specific transformation that has been applied to the data is SHA-512 of the SHA-2 family of algorithms, as published by NIST. Therefore, the data can be reliably 'matched', but not decrypted. Additional data is provided to the system through an active online monitoring solution that collects specified data points from publicly accessible systems. These publicly accessible systems may be operated illegally or legally with the consumer's permission. Finally data may also be provided resulting from forensic investigations where government or information security professionals identify information deemed sensitive and exposed.

As noted above most of the Data that is included is that data which has been exposed beyond the authorized persons who were allowed. This means that we work with organizations that have had a security breach as a result of hackers, human error, or mistake. Data is also captured from the public space. This information is gathered using passive means while connecting with the sites and systems that store, sell, and distribute exposed sensitive information.

All of the data received from customers is cryptographically hashed at the customer site, and then encrypted and transferred to our location. The encryption utilized is recommended by the NSA and is considered sufficient for Top Secret government information. The implementation of this cryptographic hash is also considered 'one-way'—meaning that the data for all practical considerations is a one way computation that is not reversible.

As the data is transformed, it is no longer considered sensitive in most parts of the world based upon existing best practices and governing law. For those other areas and for concerned businesses, we adhere to the fair use permissions already existing for the organization by their customers. We continue to act as a service provider for our customers by providing ongoing fraud monitoring services. Given that exposed data may be held for almost 18 months prior to being used, a long term approach is necessary to protect consumers in today's digital age.

Figure 5:
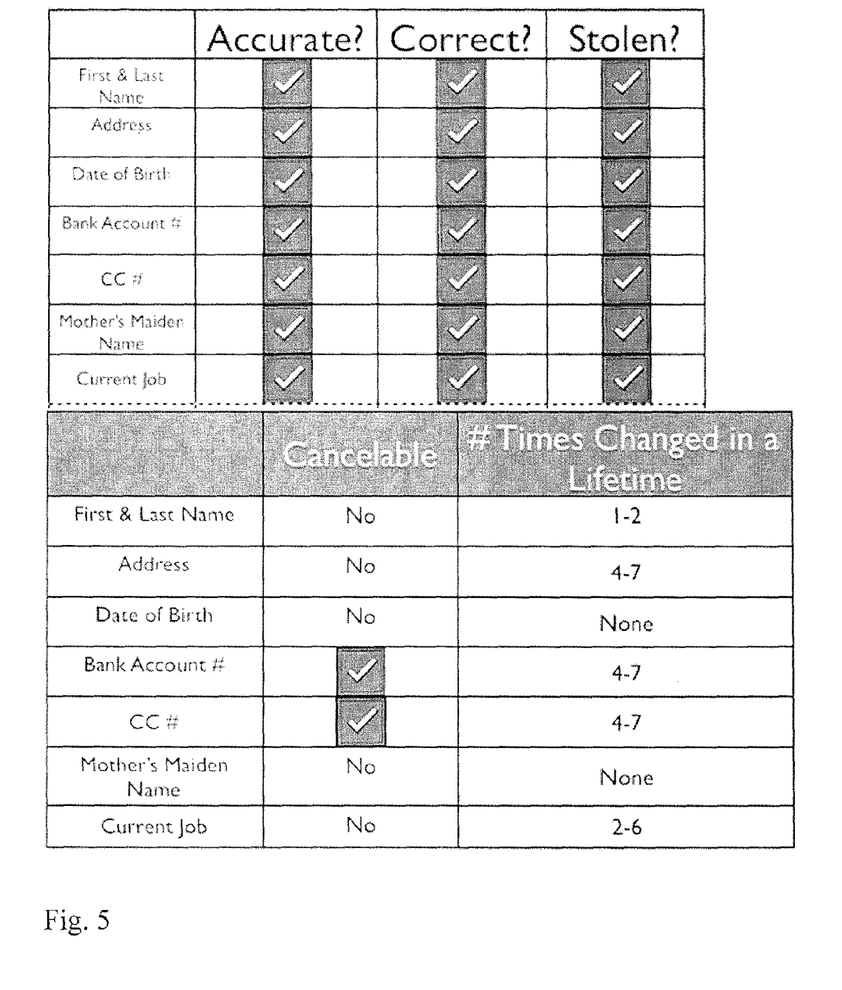
FIG. 5: shows two tables highlighting the lifetime value of personal data facts.

Referring to FIG. 5, and as will be understood some of this information—birthdate, last name, first name, social security number, hometown, birth place, favorite team, first pet, and other such qualifiers currently employed during the authentication and authorization process do not change over time. These responses exist for the lifetime of the victim. Other additional common data points do change over time, but each change at varying timeframes and the statistical majority remain valid for many years—i.e., current city, current state, current zip code, current phone number, current employer.

For data obtained from providers who have suffered breached records, the data is physically transported and then loaded into the primary database. In this environment clearly, Providers are aware of data that is to be provided to the BRID. Data may be resident in an online/offline database or a CSV, XLS, or similar flat file. Our Program will identify or "map" the client file structure to BRID header structure, such as through a simple xml file that can re-order based on the client data for each engagement. Headers are defined or selected within our primary application and new Headers may be created. However, conversion/transformation should be relative to each Header Examples of headers (new ones will be necessary based on client data):
Social Security Number (SSN)
Employee ID
Driver's License #
Passport/Alien registration #
Credit/Debit Card #
Phone #
Street Address (with city/state/zip)
Checking/Savings Acct #
Login credentials
Biometric fingerprint
DNA Profile
Tribal/Federal/Other ID
First Name
Last Name
Driver's License Expiration Date
Driver's License State
SSN Last 4 Digits
City Address
State
Zip code (5 digit)
PIN or password
Unique Electronic Data Zip code (with hyphen)
Suite/Apt #
Country
Province
Email 1 . . . N
Blood Type
Person's Initials
Taxpayer ID
School ID #
Place of Employment
Mother's Maiden Name
Medical Information
Electronic Signature
Occupational ID The weighting and associative relationships between defined data elements are shown in the table reproduced in FIG. 4.

The Program, based on headers such as those above, transforms the data to meet a Common Data Standard that is utilized throughout the entire application.
        Input is client flat file/database
        Output is transformed records
    Program then hashes each data field independently using SHA-512
    Program's output is suitable for travel and to load into primary database
    Output is then loaded into primary database
        Additional data is necessary for each loaded data
            Client ID
            Date Acquired by us
            Date Breach initially occurred
            Fraud Activity—yes/no (either the data has ALREADY been used or it has not)
            Probability of Fraud—High (meaning it was stolen specifically); Medium (in hands of criminals); Low (example: Dropped it in the river)
            Industry Type Data Provider Organizations that have suffered a data breach, been exposed inadvertently, or suspect a probable breach of sensitive data seek two remedies. The first is to satisfy government requirements to minimize, monitor, and report fraudulent activities that result from these events. The second remedy is assurance for their customers that their data is or is not being abused.

The current solution relies on collection of information from these individuals and from active information collection systems to make a repository available for subscribers. The inclusion of data from Data Providers allows for near real-time monitoring of account information. Decisions are not based on fraud analytics and trended behavior. Rather decisions are based on active fraud, and reporting is based on fraud. We use analytics to increase the service but do not apply subjective manipulations of the data. If an account was part of a fraud or breached or a part of similar data, and that information is being supplied it is prudent to use additional means to ensure against fraud to protect both the client and the business.

For these data provider entities the process is represented in FIG. 1.

1. Breached Institutions are solicited to become clients and provide their data into the system for monitoring services:
    a. On the client site, our software is provided to the client:
        i. Data is transformed into standard format structure for each field;
        ii. Data is cryptographically hashed utilizing SHA-512;
        iii. Data records are tagged with unique field, institution, and discretionary data points (no sensitive or company identifiable information); and
        iv. Data is then encrypted and transferred (physically or via online transfer) to B.R.I.D. (Breached Record Data Base).
    b. Data is merged into primary data system:
        i. Collisions of data records are identified and records updated;
        ii. Indexes are updated for search algorithms; and
        iii. Heuristics are updated.

The foundations of this system are the ability to transform sensitive data to non-sensitive data, produce a purely anonymous data-set, employ an algorithm that operates within such a blind environment, and then provide such determinations regarding the unique and private nature of the data for the purposes of determining the likelihood of accurate identification of an individual. These foundational pieces enable the deployment, processing, and transacting of this transformed data to be accessible and reside on dispersed computing systems—technically identified as such 'Cloud' and 'Shared Computing Environments' (i.e., Amazon AWS, Amazon S3, IBM Cloud data centers). The system enables businesses to operate within untrusted/unauditable environments, and on systems beyond their immediate control.

Data is transformed using an encoding process that involves six conversions of the data. This process is executed at a field level within the data. The process maintains the relationship between originally related dataset fields while eliminating all identifiers that establish this within the customer systems. The transformation alters the text through an encoding process that enables international characters and unstructured data to be processed. During the encoding process, which is a part of the transformation process, the data of each field is normalized using a built in engine. This engine "reads" each field header-marker and then at a field level processes the data into a structure that is consistent. Data is Encoded as UTF-8; Binary Representation Hashed (SHA-512); Hashed Representation Base64 Encoded; Base64 Chars encoded as ISO-8859-1 and Stored as UTF-8 in the Database This is a cryptographic encryption hashing algorithm that through a public and government endorsed Federal Information Processing Standards compliant process converts the data into a single set of fixed length values which represent the field level data. The process is theoretically not reversible and completely transforms the data beyond the original state. This converted data output is then loaded into the database application servers and becomes part of the global comparison system.

All data collected is done through a transformation process. The client identifier provided with the data does not contain the client name, address, or any other information that has not been transformed. This data is kept in an offline non-networked system that maintains the keys to the identifiers. This ensures complete assurance that the information is not matched together.

The querying of the system to indicate whether the data identifying an individual has previously been exposed and therefore may be unreliable follows the same transformation process described above, but instead of a large number of records being transformed (while it may occur in batches, this processing is done more often in real-time on as-need basis by the client) the system processes each record individually. Those clients querying the system transform the data using an application provided to them internally within their financial systems. This application handles the transformation and communications of the data. The data is transformed, communicated through a secure channel, processed, and a response is provided regarding the datasets value and rating indications of uniqueness and private status.

The invention includes an algorithm that has been developed, and continually improved, to allow for the evaluation of field level data-sets that are completely transformed and determine the validity of information presented. This process is achieved through the establishment of what is considered primary and secondary fields. These fields are those where specific value determinations are established based on the header fields of each data set—i.e., the data type determines the value. This value is combined with a weighting variable that establishes what kind of dependencies are required for the specific value to be applied during the calculations. Primary fields are those that strongly relate to the determination of authorization and authentication of individuals. Meaning, some values are defined based on their dependency within the authorization and authentication system, and not simply based on the type of data it is within the common view. The algorithm specifically establishes three tiers: 1—unique; 2—requires support; and, 3—supportive. The algorithm, in contrast to other approaches, allows for the fact that unique data that has been exposed will rise to the top through a prioritization and calculation system. The end result is a full value that indicates whether or not the provided information is unique and exposed.

The output of the system to submitted queries is a numeric score and risk value of the data submitted based on the collective accumulation of tiered and associated values for a record.

Subscribers Institutions, financial specifically, that seek verification of users through online systems rely upon specific information. The depth of verification is based upon a risk program that determines what is an ideal amount to collect, not lose applicants, but enough to ensure validity. By providing an additional value point the institutions can reduce the number of fields per application; lower drop rates; and decrease fraudulent accounts.

Figure 6:
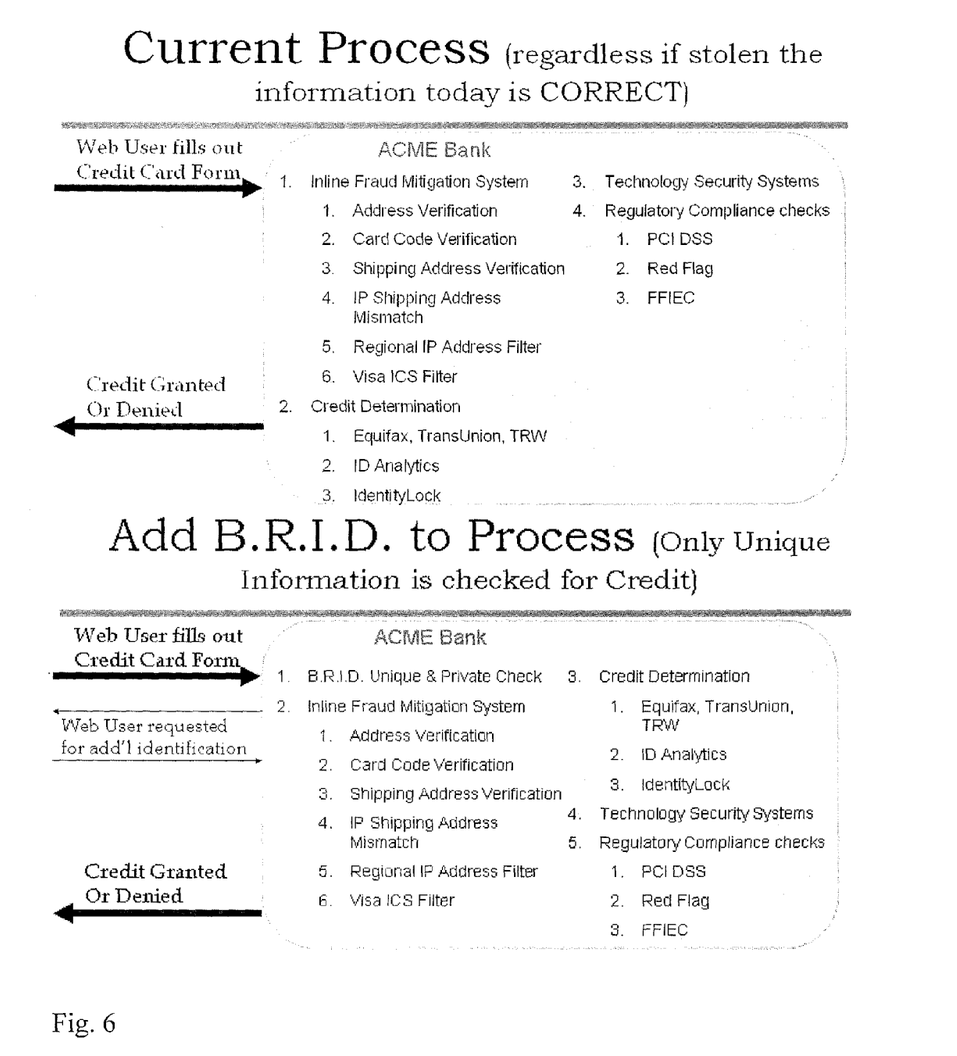
FIG. 6: shows two diagrams demonstrating how Invention operates with Bank setting up new customer account.

The present invention is designed to allow a remote client/subscriber to query the breached record database via a simple REST-like protocol. The current client implementation is a Java-based implementation and exposes a Java API for platform independent integration with a client's existing resources. FIG. 6. presents a comparison of the existing client resources and the integration of the current invention into these resources.

In a typical client/subscriber's setup, the Java API is integrated into an existing application or a simple Java Application is created to make use of the API. A query is created programmatically and submitted to our server for processing. The server responds with a perceived 'risk-level' based on the submitted query parameters.

Before transmitting the data specified in the query, the client/subscriber normalizes and cryptographically hashes the individual data fields. It does this LOCALLY (i.e. on the customer's hardware), before sending any data. The transformed data is then Base64 encoded (for compact transmission) and finally URL encoded for HTTP suitability. Finally, the data is submitted over a secure, HTTPS connection, and the client/subscriber awaits a response.

Upon receiving the data from the client/subscriber the server will attempt to match the 'hash signature' of each item against the items in the database. Depending on the data matched and a proprietary score, a 'Risk Level', HIGH, MEDIUM, or LOW will be assigned to the query. Raw numbers are also available for transmission in lieu of the "HIGH, MEDIUM, LOW" for each client certificate. This value is returned to the client/subscriber in a similar URL encoded format and the result is made available via the Java API.

The client/subscriber .jar file contains an X.509 client certificate unique to customer. The server will only accept a valid certificate submitted by the Java client/subscriber. The client/subscriber will only transact with a proprietary server that issues a valid server certificate. For this reason, the distribution of and access to the .jar file is carefully controlled.

Figure 2:
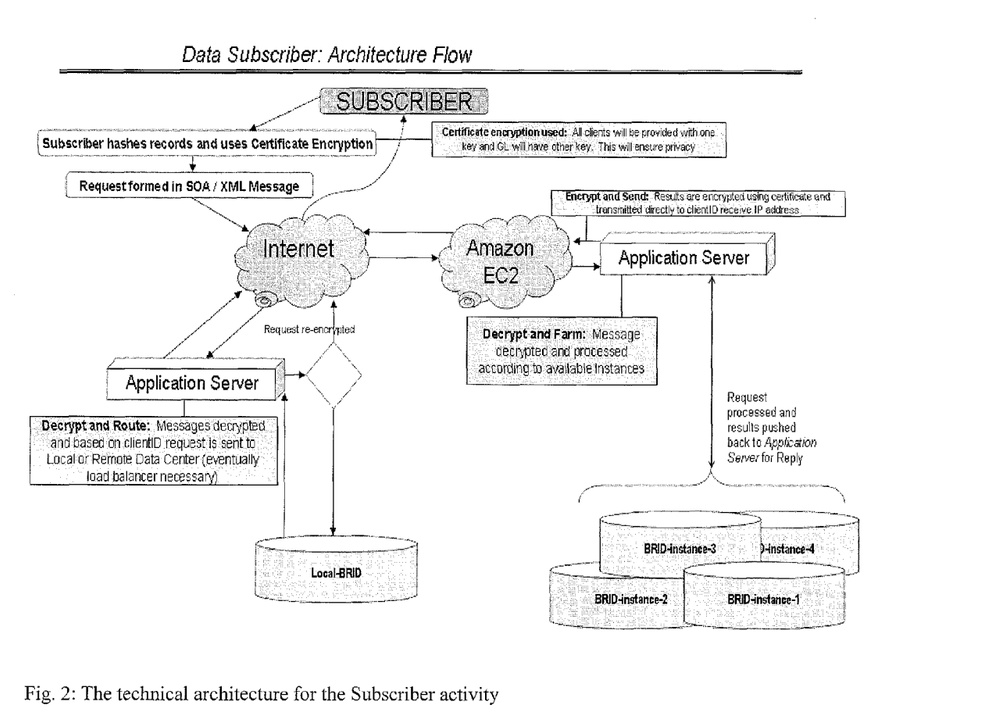
FIG. 2 shows the technical architecture for the Subscriber activity.
Figure 3:
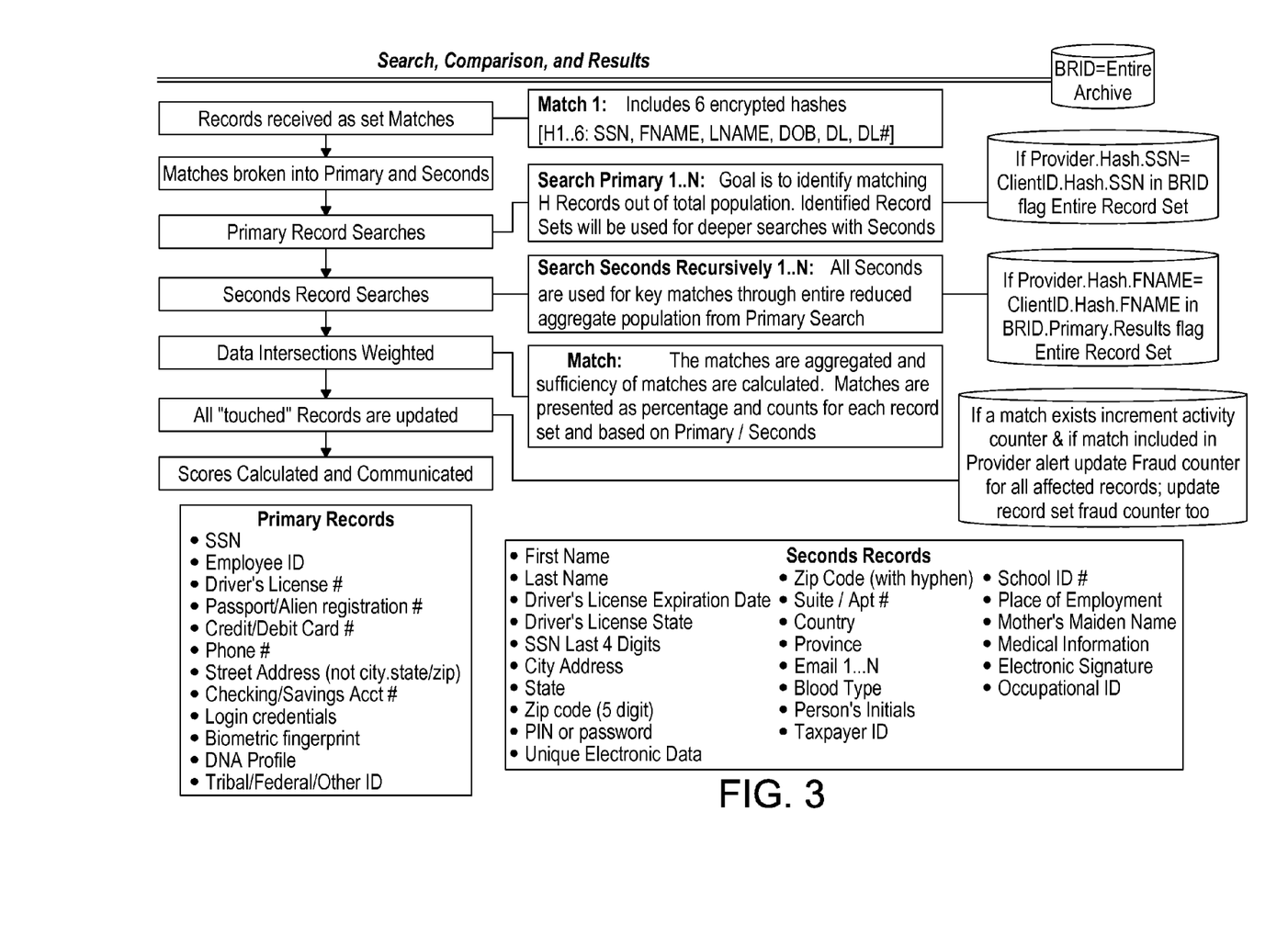
FIG. 3 shows the search algorithm used in the present invention.

Referring to FIG. 2 it may be seen that a subscriber institution follows these steps in submitting a query.

1. The Subscriber institution is provided with 'personal information
2. Data is submitted to my system for comparisons:
   a. Data is transformed to required format at Subscriber site;
   b. Data is cryptographically hashed utilizing SHA2-512;
   c. Data records are tagged with unique field, Client ID, and discretionary data points (no sensitive; company information is included); and
   d. Data is then encrypted and transferred via online transfer to B.R.I.D. (Breached Record Data Base) for query.
3. System compares all fields through lattice-like recursive searches
4. Findings are compared; condensed; and any correlation to breaches evaluated
5. Risk Score findings generated
6. Findings sent to Subscriber Collisions do occur in hashing and it is those collisions that facilitate our ability to detect fraud. As an organization, we never see the comparison fields. Our subscribers cryptographically hash THEIR data prior to transmitting it to our systems. Meaning we only see the resulting hash, and therefore never know the clear text of the query. The absolute result is an independent third party that enables anonymous comparisons of data without visibility into such data.

Providing data utilizing our hashing technology ensures protection for customer's sensitive information. To protect company information we maintain two separate systems. One system is the online archive and a private identification code is used to indicate subscriber/client information. A second system that is physically isolated and OFFLINE (meaning zero network connectivity) holds the only key that identifies which 'identification code' matches which subscriber/client. To support the monitoring and alerting functions however, a system queries the online system for activity on customer accounts and queues these for notification to the subscriber/client. No Subscriber will know which data records belong to any organization. The manner of notification utilized is of the client's choosing, but this system is one way and continues to isolate company information.

For the Subscriber the query data sequence is as follows.
Details: Similar to the 'Data Input' code; however, this one is to be automated, installed on client system, perhaps integrated into their systems, and shall communicate via web service
Environment: Subscribers have a current process of validating the data within their system and that includes querying Credit Agencies/Government databases for each field provided. Our process adds a database procedure or such script to their system that transforms; hashes; transmits; and receives a response from our system Program will allow us to define a "map" for the client file structure to our own header structure (such as by a simple xml file that can be re-ordered based on the client data for each engagement)
   Headers are defined within our primary application
   New Headers may be created
   Conversion/Transformation (regular expression or others) should be relative to each Header
   Examples of headers are listed above.
Program, based on above headers, transforms the data to meet a Common Data Standard that is utilized throughout the entire application.
   Input is client flat file/database
   Output is transformed records
Program then hashes each data field independently using SHA-512
Program's output is suitable for travel across internet
Program through web service transmits to Primary Data Application for response
Output of Query must include, at least:
   Client ID
   Date/Time transmitted
   Transaction #
Primary Data Application provides SOA/Other response
Response includes:
   Transaction #
   Unique; Private; Identification; Identifier Rating
Primary Database
   Search and Comparison requirements
     Some records are unique in themselves—SSN, U.S. MILITARY ID
     Some records are likely to have high collision rates (less unique): first name, state, etc.
     Some records are more private vs. public than others
       Address/email: public
       Blood type: private
     Records relate to their own recordset per data provider and to other provider record sets
       1 person may be a customer of 2 providers and hence the information exist in each (albeit the information stored may be different and the information would only come to the database from both providers if both had security breaches.)
     One approach:
       Search by 'primary' records
       Then do sub-searches of these results for every secondary field
     Search templates may be crafted for each client; index may be created for specific client that only looks for specific data headers (could enhance speed)
Primary Data Application
   Environment: Our Platform is Linux (CentOS) and MySQL is preferred. The code should be done in a manner such that each portion of the system can be broken down into separate computing systems. Initial system supports 10 million unique records=100 million actual pieces of data, approximately. The invention however does not reside in the particular operating system.
   Program handles loading of data provided from output by Providers
   Program adds additional data records and information to loaded data as appropriate
i.e., when data is loaded it needs to maintain references between associated records meaning:
   Entire file is identified with numerical identifier which has meaning to the system,
   Row 1=Headers (established in transform code project output)
   Each row is an individual record (meaning all the tab delimited items here relate to each other—think of an address: Street, City, State, Zip=together they are an address that has meaning; separate they are just fields)
   Each delimited data point within each row is hashed individually using SHA256
   Output should be a flat file or to a database—whichever is easiest
   Output=1 line for each dataset (i.e., Street on one line; City on one line, etc.) that includes:
     "Numerical File Identifier, Number of fields for Row, Header, Hash of one dataset"
   Each new Record would now be a HASH that has its own header identifier PLUS other fields, a GROUP identifier that links the original record components together (so that you know which fields were part of the original address), and a Data Source ID (that references where the data was sourced from . . . not client ID, as 1 client may have more then one dump into the system)
   For example:
     If there are 3 rows—the 1st are the headers, then rows 2, and 3 are data. Each row may contain 4 fields, so the output should have 8 TOTAL Rows
     ex: fname, lname, dob are all related so they need to have a unique identifier, but they are also individually hashed and have their own independent record information
   Program will load data to primary database
   Index will be created on this database
   Test script will be provided to validate the data was imported correctly, and standard queries work properly
   Program will separately handle the handling of Subscriber requests
   Program will receive/listen for web service queries
   Program will validate client ID code, and that transmission was complete
   Program will forward job to available database server/group
   Program will update Provider client activity file with query information
     To include:
       Actual query
     Shall be used for billing end of month and performance evaluation
   Provider upon receipt of search and correlation results shall forward response to Subscriber
     A score must be determined based on the search results
     Application should review search results and prioritize results based on Primary and Secondary search findings
     Application should consider the error rate; completeness from identified data sources; and fraud probability
     Application should consider the completeness of given GROUP record sets (i.e., if an address (road, city, state, zip) and name are part of 1 group and 4/5 records are identified as matching in a single query this should contribute to the score.
     Application should transmit a score High, Med, Low Over the course of normal business operations Subscribers (i.e., Financial Credit Issuing Institution) may experience a fraud related to a specific user account that was previously searched against the BRID. As data breaches and unintentional releases of data may occur during the lifetime of the account holder, a mechanism exists to notate the fraud risk related to given customer data. Subsequent to the first query related to the data. The system provides such a mechanism for all submitted searches through the user of a Fraud Flag. In the event that information in an an account has been utilized in a fraud, the Subscriber may programmatically assign a Fraud Flag marker to data being communicated the BRID. This is done through the program referencing the original transaction number provided during the user's initial account setup and comparison against the BRID.

The Fraud Flag is used to update associated records related to the user's account. The presence of a Fraud Flag increases the possibility of a higher (High to Medium) score. These Flags do not prohibit the establishment of a new account based on the presence, but are included in the risk calculations. Over time specific acts of fraud by criminals will occur frequently against consumer data as compared to consumer data that is not readily being employed by criminals. The rationale for the frequency may relate to incomplete datasets held by the criminals for the less than frequently used datasets, or simply another reason. The frequency of account registrations that require the presentation of personal factual information that is resident in the BRID can represent high risk account records. The system provides the ability to detect high frequency datasets, and provide Subscribers and Providers with these updates. Subscribers are provided through phone that a record identifier has been shown to be highly active. This notification provides Subscriber with the ability to enhance Identity Theft Monitoring and Remediation services for identified accounts. The identified accounts are not known in their human readable form given the data transformation. Instead, the operator of the BRID can only provide the index reference number and the Subscriber can cross reference this against the original breached dataset.

Providers that have queried the system and have existing transaction numbers paired with the datasets that demonstrate high frequency activity compared to other account datasets are provided a notification alert. These alerts reference the Providers' transaction number to allow for reverse lookups within their local consumer databases.

What I claim is:

1. A method for identifying potentially compromised identification records during identity validation procedures comprising:
   a. Providing at least one data provider with encoding and transmission software for use on a computer accessible to the at least one data provider which enables the at least one data provider to:
      i. transform data comprising a plurality of identification fields in at least one data record into a plurality of transformed fields having standard format structure for each field;
      ii. cryptographically hash each field of said plurality of transformed fields utilizing accepted cryptographic hashing protocols;
      iii. tag each of the plurality of data records that have been transformed and hashed with unique field, institution, and discretionary data points to create tagged records without use of sensitive or company identifiable information;
      iv. encrypt and transfer the tagged records from the at least one data provider to a Breached Record Data Base;
   b. Providing a Breached Record Data Base on a distributed computing network, wherein:
      i. tagged data records are merged into a primary data system;
      ii. collisions of data records are identified and records updated;
      iii. indexes are updated for search algorithms;
      iv. heuristics are updated;
   c. Providing at least one subscriber with software for use on a computer accessible to the subscriber enabling the at least one subscriber to:
      i. obtain personal information data from an individual;
      ii. transform personal information data to required format at subscriber site;
      iii. cryptographically hash the transformed personal information data utilizing complimentary cryptographic protocol to create at least one transformed and hashed subscriber data record;
      iv. tag each transformed and hashed subscriber data records with unique field, institution, and discretionary data points without use of sensitive or company identifiable information;
      v. encrypt and transfer the tagged subscriber data records from the subscriber to a data comparison computational system associated with said Breached Record Database as a query;
   d. Wherein said data comparison computational system:
      i. compares all fields of said tagged subscriber data records with data records in said Breached Record Database through lattice-like recursive searches;
      ii. compares and condenses findings to evaluate any correlation to breaches;
      iii. generates risk score findings; and
      iv. sends risk score findings to subscriber.

* * * * *